(12) United States Patent
Wang et al.

(10) Patent No.: US 6,975,507 B2
(45) Date of Patent: Dec. 13, 2005

(54) STRUCTURE OF NOTEBOOK COMPUTER

(75) Inventors: Shih-Hsuan Wang, Taipei (TW); Yu-Chi Lin, Taipei (TW)

(73) Assignee: Inventec Corporation, Taipei (TW)

(*) Notice: Subject to any disclaimer, the term of this patent is extended or adjusted under 35 U.S.C. 154(b) by 326 days.

(21) Appl. No.: 10/600,437

(22) Filed: Jun. 23, 2003

(65) Prior Publication Data

US 2004/0259593 A1 Dec. 23, 2004

(51) Int. Cl.[7] .............................................. G06F 1/16
(52) U.S. Cl. ...................... 361/683; 361/681; 248/917; 345/156; 292/358; 16/333
(58) Field of Search ......... 361/679–683; 248/917–923

(56) References Cited

U.S. PATENT DOCUMENTS

| | | | |
|---|---|---|---|
| 6,430,038 B1 * | 8/2002 | Helot et al. ................. | 361/681 |
| 6,480,373 B1 * | 11/2002 | Landry et al. .............. | 361/680 |
| 6,707,666 B1 * | 3/2004 | Chuang ....................... | 361/681 |
| 6,788,530 B2 * | 9/2004 | Hill et al. .................... | 361/683 |
| 6,873,521 B2 * | 3/2005 | Landry et al. .............. | 361/681 |
| 2003/0021082 A1 * | 1/2003 | Lu et al. ..................... | 361/683 |
| 2003/0034952 A1 * | 2/2003 | Wang et al. ................. | 361/681 |

* cited by examiner

*Primary Examiner*—Lisa Lea-Edmonds
(74) *Attorney, Agent, or Firm*—Bacon & Thomas PLLC

(57) ABSTRACT

The present invention is to provide a notebook computer having a mechanism for configuring the notebook computer as a desktop computer, wherein a housing thereof comprises a substantially rectangular first recess on a top operation surface of the housing adjacent the display for receiving a pivot board pivotably coupled to the display and the housing respectively; a substantially rectangular second recess on the operation surface distal from a display with a keyboard detachably received therein; and a support assembly at a rear surface of the housing including a foldable stand adapted to form an oblique angle with respect to the housing by extending on a desk.

4 Claims, 6 Drawing Sheets

STRUCTURE OF NOTEBOOK COMPUTER

FIELD OF THE INVENTION

The present invention relates to structure of notebook computer and more particularly to a structure of such notebook computer with improved characteristics.

BACKGROUND OF THE INVENTION

The world we are living in has entered into a new era with information prosperously being developed. All kinds of electronic and mobile communication products are invented due to the fast progress in computer science and technology. The fast development of the new products not only shortens time and space distances between people in different geographical areas, but also greatly influences our daily works or lives and it is unable to be apart therefrom. In response to all kinds of new information products being developed, especially to the notebook computers, most of the users become more critical with respect to the convenience in using them. Thus, whether the notebook computers being produced in the future can provide a more convenient and effective characteristic will be an indicator to decide whether the information technology owned by one country is more advanced than other countries.

Conventionally, from the birth of personal computers they are placed on a supporting surface (e.g., desk) due to its bulky size, heaviness, and for ease of operation. Thus, personal computers are also called desktop computers. Such computer typically comprises a monitor, a housing with a circuit board and other associated electronic components enclosed therein, and at least one input device (e.g., mouse or keyboard). The personal computers are downsized as the progress of electronics continues. As a result, a variety of portable computers are commercially available.

Early days portable computers are not lightweight. For example, a portable computer may have a weight of about 7 to 14 kilograms. As to a laptop computer, it typically weights about 4 to 7 kilograms. As to currently popular notebook computers, a typical one may only weight about 1 to 4 kilograms. A notebook computer, as self-explanatory, means the computer can be easily opened or closed just like opening or closing a notebook. Hence, notebook computers are advantageous for its portability and ease of operation. The notebook computer comprises a display, a housing, and at least one cable between the display and the housing. Further, at least one hinge is provided to interconnect the display and the housing in order for the display being rested on the housing while the notebook computer is not used. For using the notebook computer, a user can pivot the hinge to position the display at an optimum angle with respect to the housing. Thereafter, the user can input data into the computer by keying a keyboard of the computer. The data is then sent to the display via the cable and shown on the screen of the display for viewing.

The trend of developing notebook computers is slimness, compactness, and lightweight in consideration of weight and size. Moreover, an all-in-one notebook computer is constantly being sought. Nowadays, all-in-one notebook computers are dominant type of portable computers. It is understood that the information product market is very competitive. Also, a wide variety of notebook computers are available by many companies. Hence, all notebook computer manufacturers are under great pressure for obtaining a greater share of the market. In another aspect, more types of notebook computers available from different companies mean more selection options. It is concluded that if a notebook computer manufacturer wants to win over other competitive manufacturers how to provide user friendly, multi-functional yet inexpensive all-in-one notebook computers to vast consumers should be a deciding factor.

As stated above, a personal computer is typically placed on a desk due to its bulky size and heaviness. As to a notebook computer, it is appropriate to carry it due to the advantages of being slim, compact, and lightweight. But it is a great financial burden for a common people to buy two computers. Fortunately, newer models of personal computers available by computer manufacturers are featured by multi-function, user-friendly operation, and all-in-one design. Thus, it is desirable among computer manufacturers to provide more attractive notebook computers for providing more operation convenience to users in order to win in the market in view of the competitive information product market.

SUMMARY OF THE INVENTION

A primary object of the present invention is to provide a notebook computer having a mechanism for configuring the notebook computer as a desktop computer. A housing of the notebook computer comprises a substantially rectangular first recess on a top operation surface of the housing adjacent the display; a substantially rectangular second recess on the operation surface distal from a display with a keyboard detachably received therein; and a support assembly at a rear surface of the housing, the support assembly including a foldable stand adapted to form an oblique angle with respect to the housing by extending on a desk.

By utilizing this in cooperation with an appropriate operating mode, the purposes of configuring the notebook computer as a desktop computer, greatly improving functions and practicability of the notebook computer, and tailoring the needs of the competitive information product market are achieved.

The above and other objects, features and advantages of the present invention will become apparent from the following detailed description taken with the accompanying drawings.

DETAILED DESCRIPTION OF THE PREFERRED EMBODIMENTS

Figure 1:
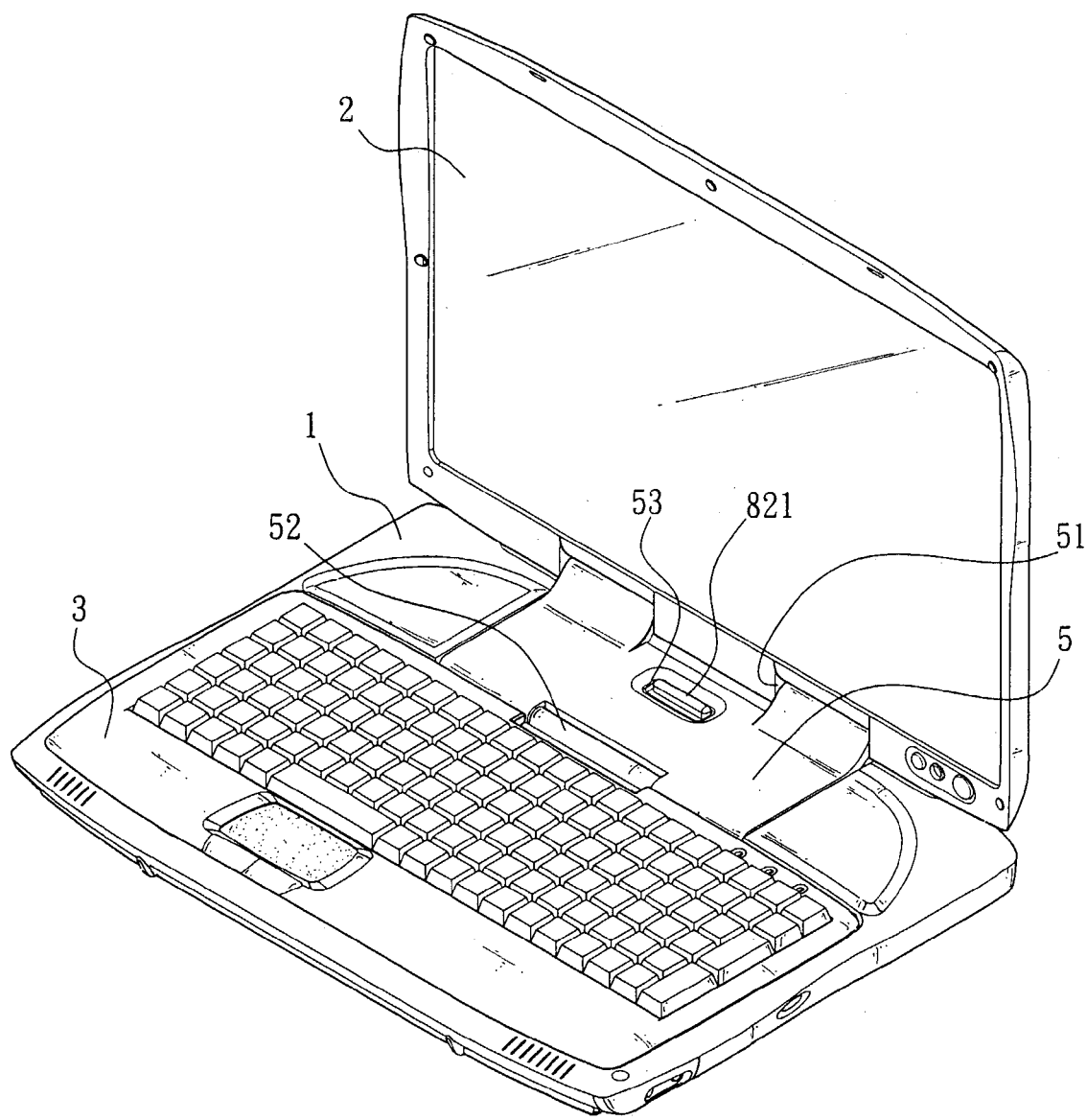
FIG. 1 is a perspective view of a preferred embodiment of notebook computer according to the invention where the notebook computer is open.
Figure 2:
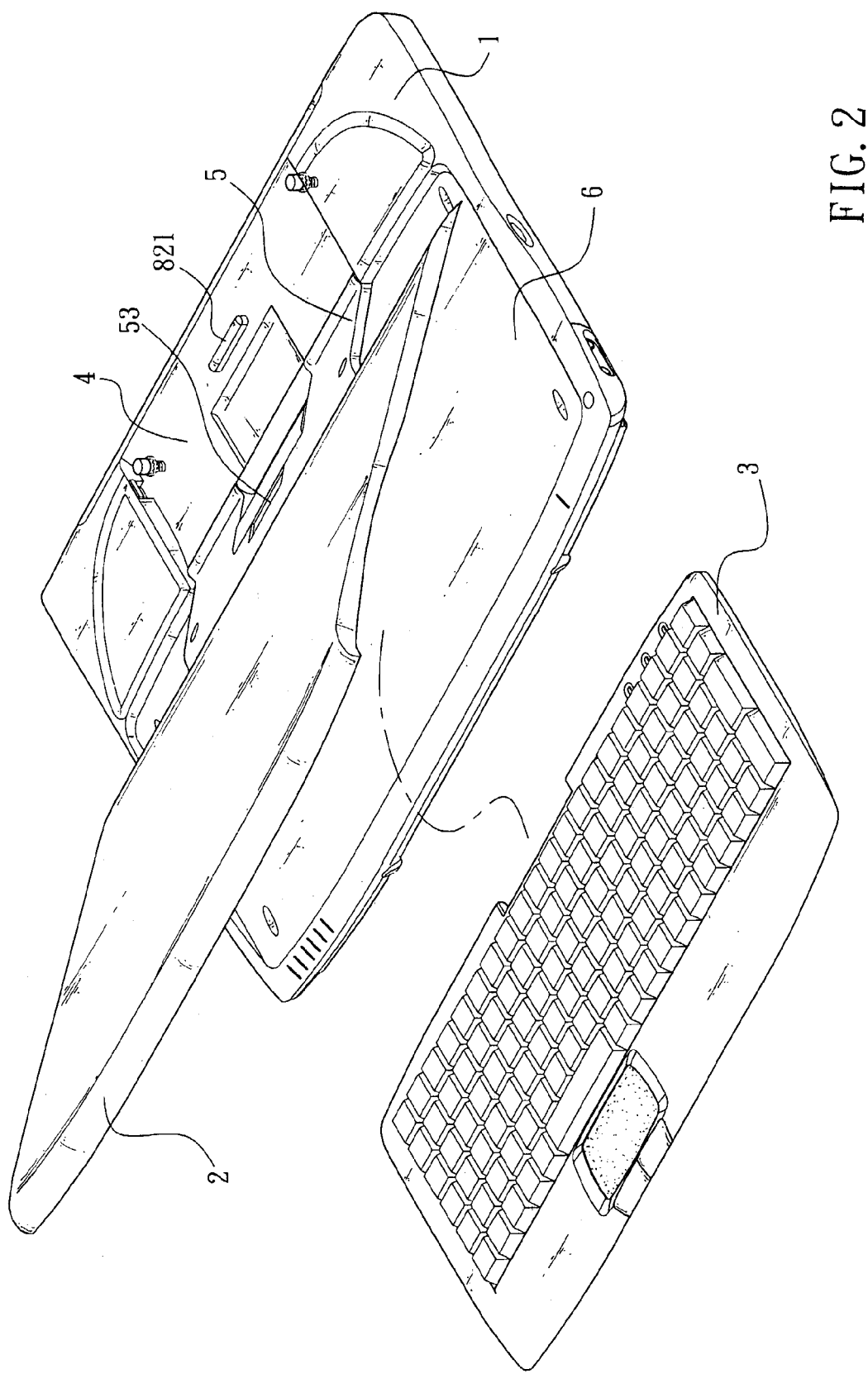
FIG. 2 is a view similar to FIG. 1 where a keyboard is detached.
Figure 3:
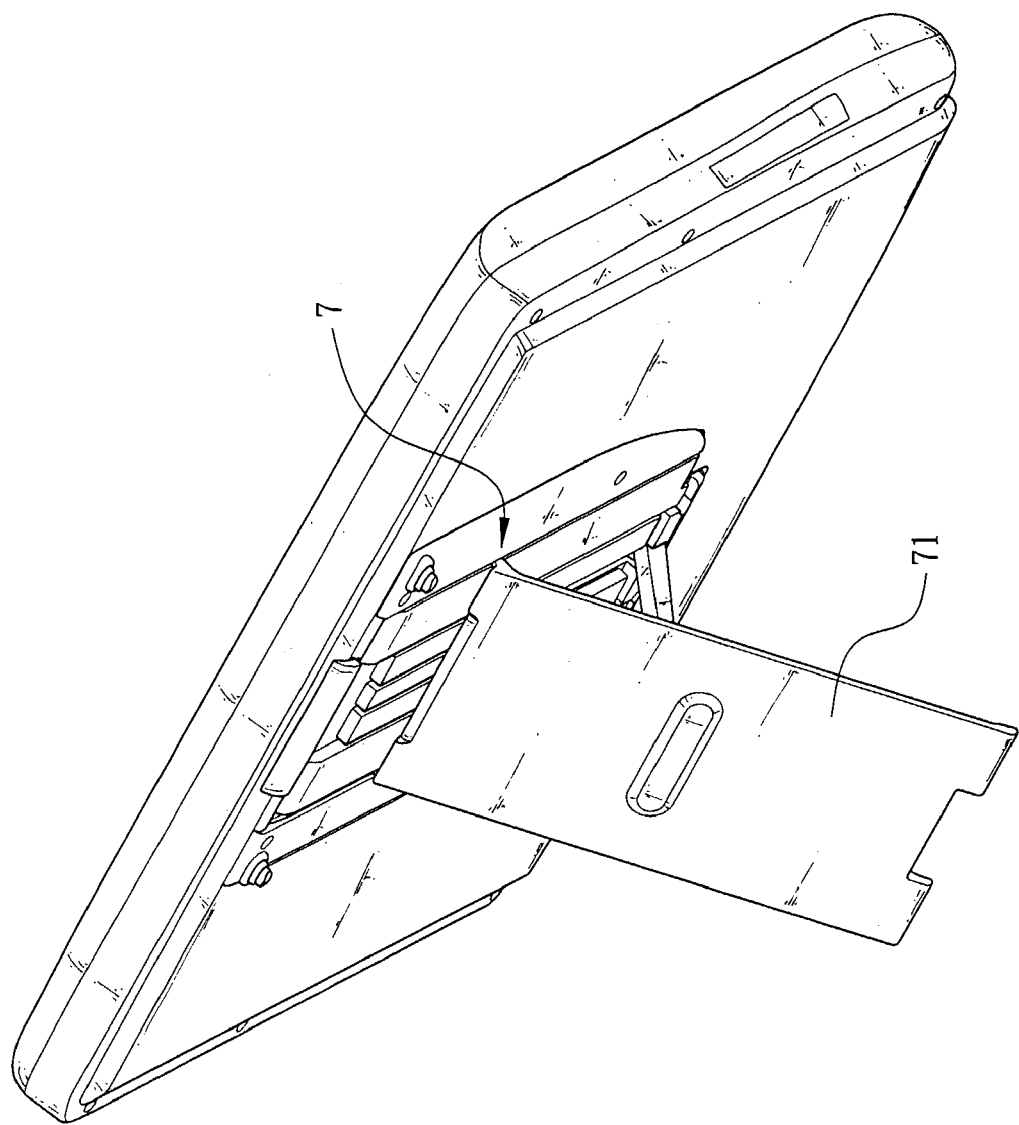
FIG. 3 is a rear perspective view where a stand of a support assembly is extended to support the notebook computer.
Figure 4:
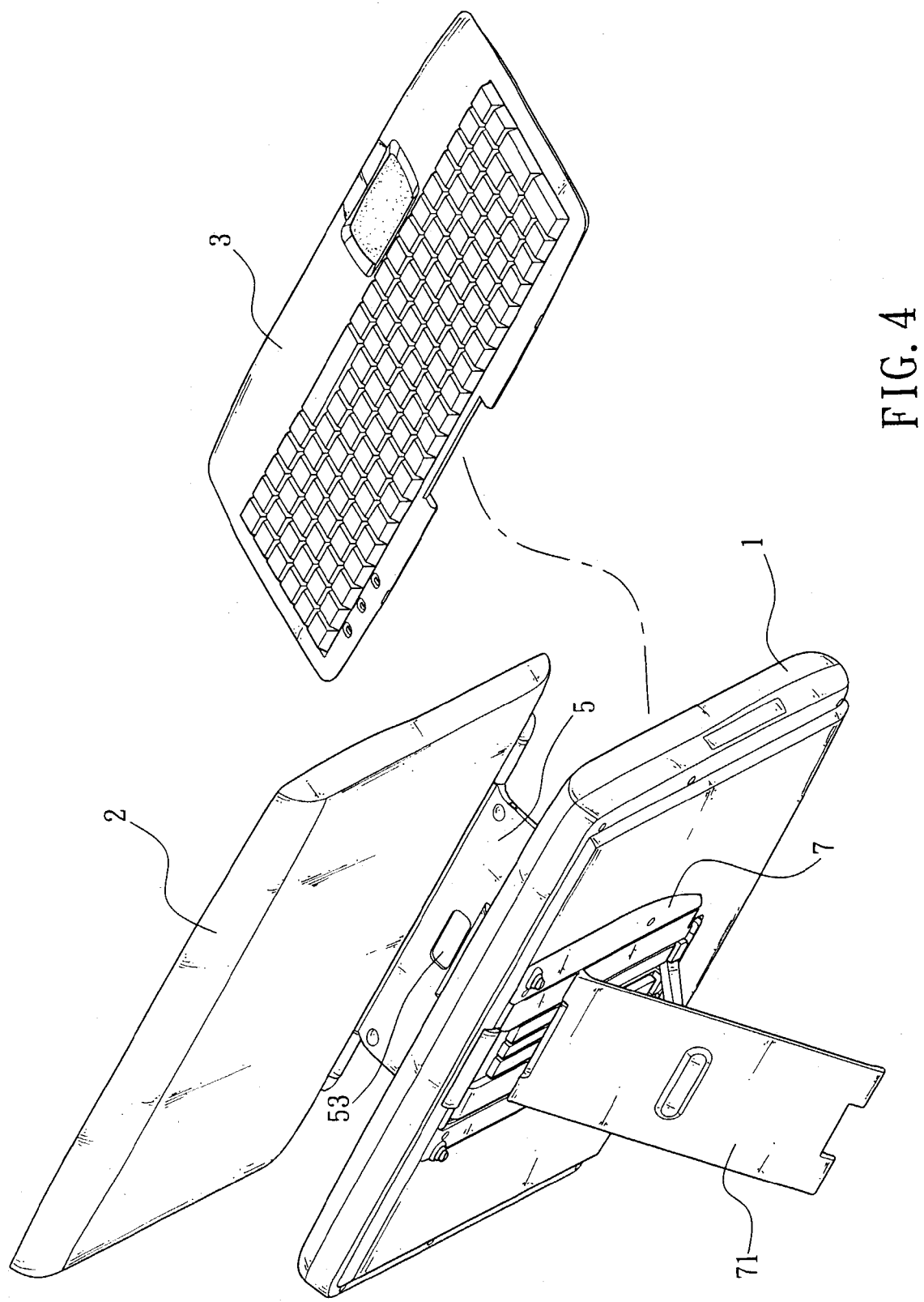
FIG. 4 is a view similar to FIG. 3 where a display is open for viewing and the keyboard is detached.

Referring to FIGS. 1, 2 and 3, a notebook computer in accordance with the invention comprises a housing 1, a display 2, and a keyboard 3. Each component will be described in detail below. A substantially rectangular first recess 4 is formed on a top (i.e., operation surface) of the housing 1 adjacent the display 2 (FIG. 2). A pivot board 5 is received in the first recess 4. The pivot board 5 comprises two spaced apart first hinges 51 at a rearward side pivotably coupled to the display 2 and a second hinge 52 at a forward side pivotably coupled to the housing 1. Further, a substantially rectangular second recess 6 is formed on the operation surface of the housing 1 distal from the display 2 (FIG. 2). The keyboard 3 is removably received in the second recess 6. A support assembly 7 is formed at another surface (e.g., rear side) of the housing 1. The support assembly 7 comprises a foldable stand 71 having one end hingedly coupled to the support assembly 7 and the other end adapted to form an angle with respect to the housing 1 as it extends from the housing 1 to stand on a supporting surface.

Referring to FIGS. 1 to 4, uses or operating modes of the invention for configuring a notebook computer as a desktop computer will now be described in detail below.

A first operating mode: First place the notebook computer on a desk (see FIG. 1). Next, pivot the display 2 upward about the first hinges 51 until the display 2 is positioned at an optimum position and angle with respect to the housing 1. A user then may operate the keyboard 3 to input data into the housing 1. Next, data is sent to the display 2 from the housing 1. Finally, data is shown on the screen of the display 2 for viewing.

A second operating mode: A user may pivot the display 2 about the second hinge 52 for raising height of the display 2 under the first operating mode (see FIG. 2). As a result, the pivot board 5 pivots to extend from the second recess 6 until the pivot board 5 is positioned at an optimum position and angle with respect to the housing 1. Next, pivot the display 2 upward about the first hinges 51 until the display 2 is positioned at an optimum position and angle with respect to the housing 1. An optimum distance between the display 2 and the housing 1 can be obtained by repeating the above adjustment procedure. As an end, a user can view the display 2 at an optimum height and angle.

A third operating mode: A user can detach the keyboard 3 from the second recess 6 and place it on an appropriate position on the desk for operation if the user feels that the keyboard 3 mounted in the housing 1 may cause inconvenience in operation because the keyboard 3 is excessively close to the display 2 under the first or the second operating mode (see FIG. 2).

A fourth operating mode: A user may appropriately extend the stand 71 from the housing 1 to form an optimum angle therebetween if the user feels that the viewing height of the display 2 is still not enough under the third operating mode. At this time, the notebook computer is supported on a supporting surface (e.g., desk) by both the stand 71 and the housing 1. Next, pivot the display 2 upward about the first hinges 51 until the display 2 is positioned at an optimum position and angle with respect to the housing 1. As an end, a user can view the display 2 at an optimum height and angle (see FIGS. 3 and 4).

Referring to FIG. 2 again, in the invention a first wireless transceiver (not shown) is provided in the keyboard 3 and a second wireless transceiver (not shown) is provided in the second recess 6 respectively since, as stated above, the keyboard 3 can be detached from the second recess 6 to place on an appropriate position for operation. Signals can be transmitted and received between the keyboard 3 and the housing 1 via both the first and the second wireless transceivers. As a result, data can be correctly inputted into the computer.

Figure 5:
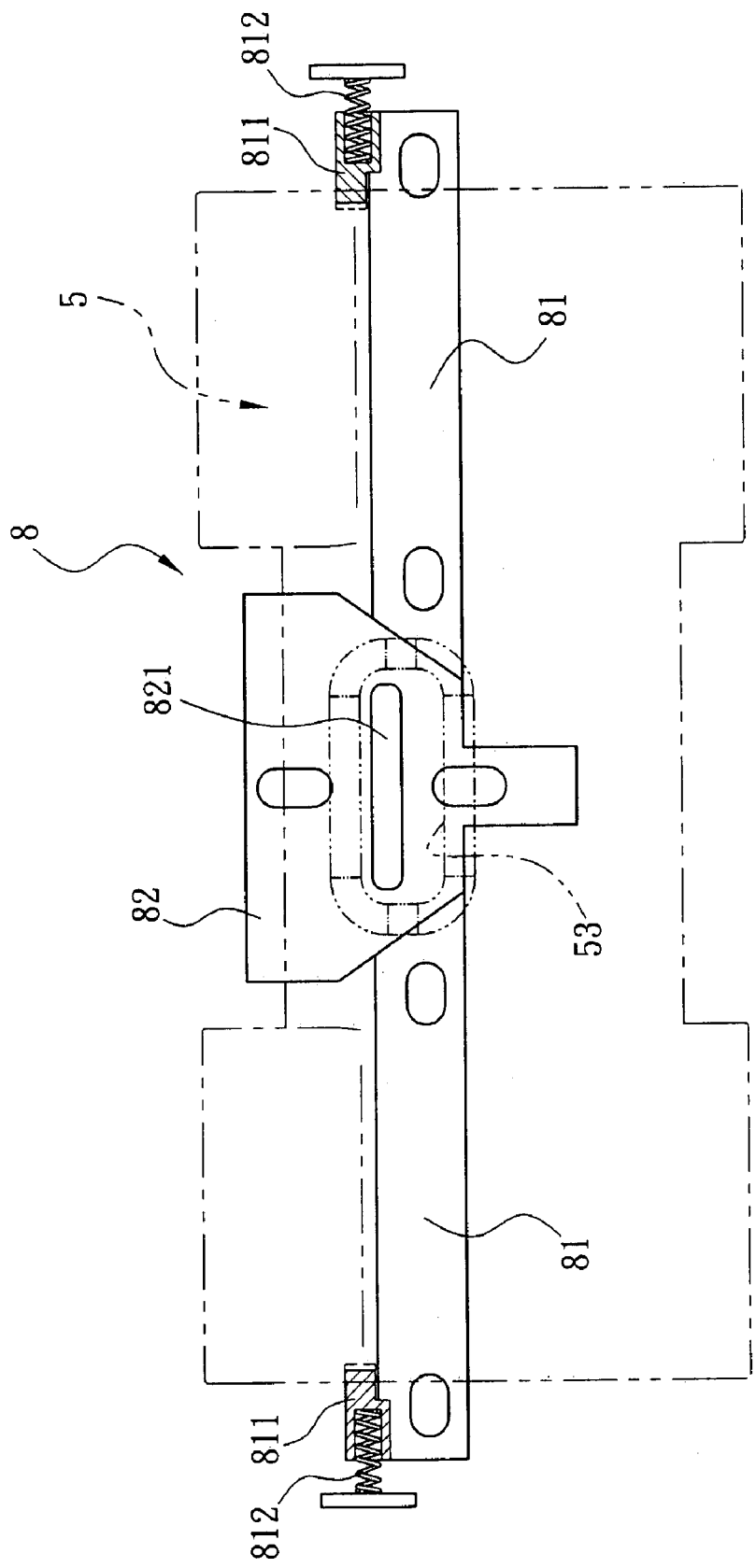
FIG. 5 is a top plan view of a latch device of the notebook computer.

Referring to FIGS. 1 to 5, in the invention a plate-shaped latch device 8 is provided within the housing 1. The latch device 8 is disposed corresponding to the first recess 4 (FIG. 5). The latch device 8 comprises an elongated latch board 81 at either side, a trigger 82 between the latch boards 81, and an elongated finger tab 821 on top of the trigger 82 so that the finger tab 821 can be projected from an opening 53 of the pivot board 5 when the pivot board 5 is received in the first recess 4. The latch board 81 comprises a latch member 811 at an outer end distal from the trigger 82. The latch members 811 are projected from two opposite sides of the first recess 4 for snapping into side cavities of the pivot board 5 so as to fasten the pivot board 5 in the first recess 4.

By configuring as above, a forward push of the finger tab 821 causes the trigger 82 to move the latch boards 81 toward both left and right sides of the housing 1 for disengaging the latch members 811 from the pivot board 5. At this time, a user can pivot the display 2 upward for adjusting height and position of the display 2 relative to the housing 1. Moreover, a resilient member (e.g., spring) 812 is anchored in a lateral tunnel of the latch member 811 of either latch board 81. As such, a rearward movement of the finger tab 821 causes the latch members 811 to engage with the pivot board 5 to return to the original non-operating position by expanding the resilient members 812.

Referring to FIGS. 1 to 6, in the invention a number of embodiments of the support assembly 7 are made possible as long as an optimum angle between the stand 71 and the housing 1 on a supporting surface (e.g., desk or ground) can be obtained, i.e., the housing 1 is slanted with respect to the supporting surface as the stand 71 is extended. One embodiment of the support assembly 7 will now be described in detail below.

Figure 6:
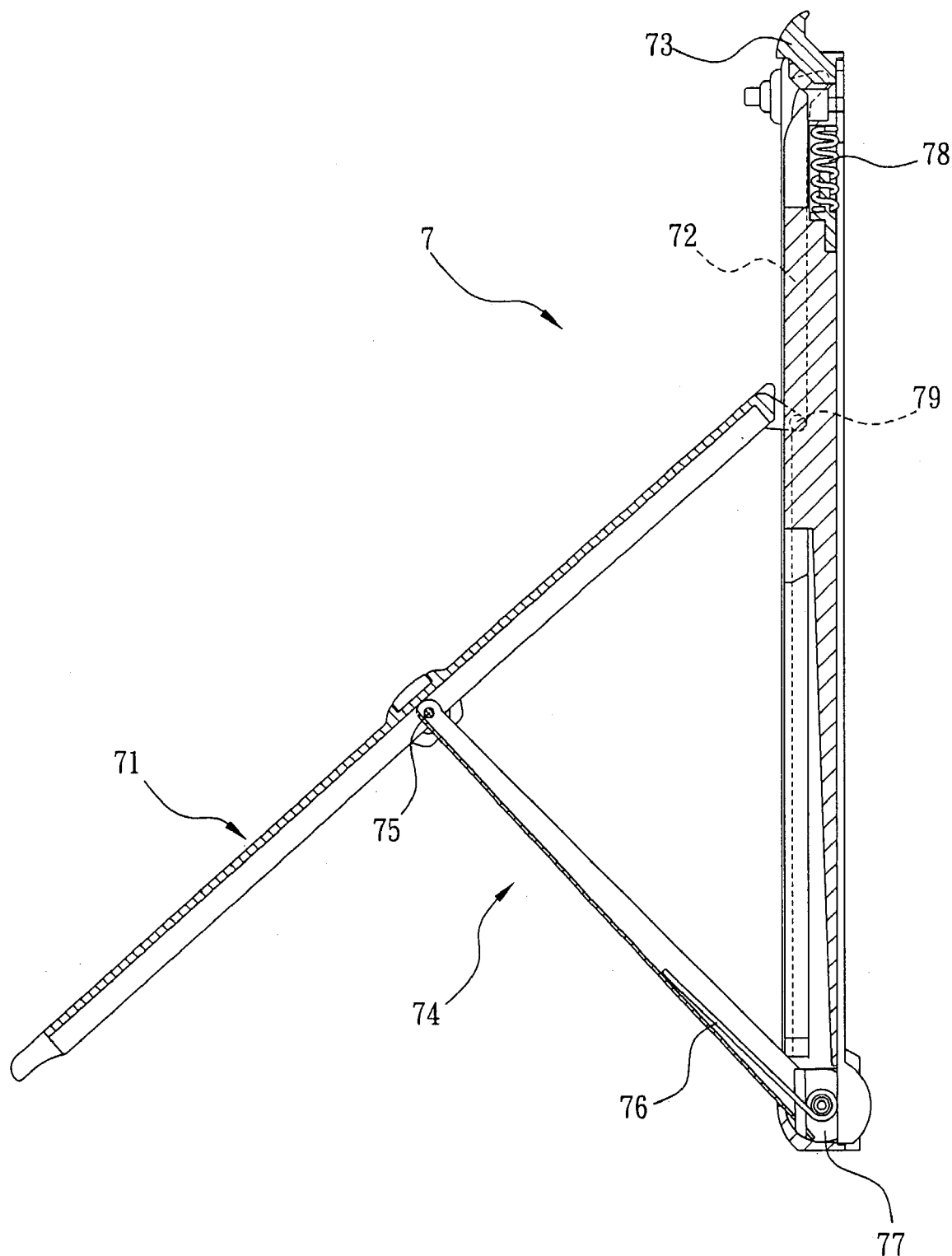
FIG. 6 is a cross-sectional view of the notebook computer for depicting the support assembly.

The support assembly 7 comprises a plate 72 at a rear side of the notebook computer, the plate 72 including a protruded clip 73 and a resilient element (e.g., spring) 78 both on top (see FIG. 6). The support assembly 7 further comprises a foldable stand 71 pivotably coupled to the plate 72, a link 74 having one end pivotably coupled to a first pivot 75 at about center of the stand 71 and the other end pivotably coupled to a second pivot 77 at a bottom of the plate 72, and a torsion spring 76 mounted at the second pivot 77 for biasing against the other end of the link 74. In a case that the clip 73 is pressed left and right sliding blocks (not shown) in the plate 72 slide toward sides of the plate 72 respectively. As a result, the stand 71 is unlocked from the plate 72. At the same time, the torsion spring 76 expands to pivot the link 74 outward for lowering one end of the stand 71, pivotably coupled to two hinges 79 of the plate 72, along two longitudinal grooves (not shown) of the plate 72 for extending the stand 71 until a predetermined angle between the stand 71 and the housing 1 is obtained. Hence, by utilizing the invention an optimum viewing angle and operating mode of the display 2 can be carried out.

In conclusion, if a notebook computer manufacturer wants to win over other competitive manufacturers how to make and use the invention should be a deciding factor.

While the invention has been described by means of specific embodiments, numerous modifications and variations could be made thereto by those skilled in the art without departing from the scope and spirit of the invention set forth in the claims.

What is claimed is:

1. A notebook computer including a display, a keyboard and a housing, wherein the housing comprising:

a substantially rectangular first recess on a top operation surface of the housing adjacent the display;

a pivot board in the first recess, the pivot board including two spaced apart first hinges at one side pivotably coupled to the display and a second hinge at the other side pivotably coupled to the housing;

a substantially rectangular second recess on the operation surface distal from the display with the keyboard detachably received therein; and a support assembly at a rear surface of the housing, the support assembly including a foldable stand having one end hingedly coupled to the support assembly and the other end adapted to form an angle with respect to the housing responsive to extending from the housing.

2. The notebook computer of claim 1, wherein the keyboard comprises a first wireless transceiver and the second recess comprises a second wireless transceiver for communicating signals with the first wireless transceiver.

3. The notebook computer of claim 1, further comprising a plate-shaped latch device within the housing, the latch device being disposed corresponding to the first recess, the latch device comprising:

two elongated latch boards at both sides, each of the latch boards including a latch member at an outer end and a resilient member anchored in the latch member so that the latch members are capable of projecting from two opposite sides of the first recess for snapping into side cavities of the pivot board for fastening the pivot board in the first recess; and a trigger between the latch boards, the trigger including a top finger tab projected from the first recess so that the finger tab is adapted to protrude from an opening of the pivot board when the pivot board is received in the first recess.

4. The notebook computer of claim 1, wherein the support assembly comprises:

a plate at a rear side of the notebook computer, the plate including a top projected, spring biased clip, the clip being adapted to press for sliding left and right sliding blocks in the plate toward both sides of the plate respectively;

a link having one end pivotably coupled to a first pivot at a center of the stand and the other end pivotably coupled to a second pivot at a bottom of the plate;

a spring at the second pivot for biasing against the other end of the link; and two longitudinal grooves at the plate so that responsive to sliding the left and the right sliding blocks toward both sides of the plate respectively, unlocking the stand from the plate, expanding the spring to pivot the link outward for lowering one end of the stand, pivotably coupled to two hinges of the plate, along the longitudinal grooves for extending the stand, and forming a predetermined angle between the stand and the housing.

* * * * *